United States Patent
Park (10) Patent No.: US 9,848,387 B2
(45) Date of Patent: Dec. 19, 2017

(54) ELECTRONIC DEVICE AND DISPLAY CONTROL METHOD THEREOF

(71) Applicant: Hyundai Motor Company, Seoul (KR)

(72) Inventor: Un Kyu Park, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/960,342

(22) Filed: Dec. 5, 2015

(65) Prior Publication Data

US 2016/0330691 A1 Nov. 10, 2016

(30) Foreign Application Priority Data

May 7, 2015 (KR) .................. 10-2015-0063929

(51) Int. Cl.
| | |
|---|---|
| *H04B 1/08* | (2006.01) |
| *H04B 1/3822* | (2015.01) |
| *H04W 52/02* | (2009.01) |
| *G01C 19/42* | (2006.01) |

(52) U.S. Cl.
CPC ........ *H04W 52/0254* (2013.01); *G01C 19/42* (2013.01); *H04W 52/028* (2013.01)

(58) Field of Classification Search
CPC .... H04B 1/082; H04B 1/3822; H04B 5/0043; H04W 52/028; G01C 19/42; G01P 15/00; G01D 5/00
See application file for complete search history.

(56) References Cited

U.S. PATENT DOCUMENTS

| | | | | |
|---|---|---|---|---|
| 2005/0184860 A1* | 8/2005 | Taruki | ......... | H04B 1/3877 340/441 |
| 2007/0171218 A1* | 7/2007 | Hong | ......... | G09G 3/3406 345/211 |
| 2010/0216509 A1* | 8/2010 | Riemer | ......... | H04M 1/72577 455/557 |
| 2012/0021717 A1* | 1/2012 | Schmidt | ......... | H04M 1/72577 455/404.2 |
| 2013/0303143 A1* | 11/2013 | Schrader | ......... | H04W 12/08 455/418 |
| 2015/0056973 A1* | 2/2015 | Efrati | ......... | H04W 76/064 455/418 |
| 2016/0094707 A1* | 3/2016 | Stuntebeck | ......... | H04M 1/72577 455/418 |
| 2016/0198319 A1* | 7/2016 | Huang | ......... | H04L 67/26 455/412.2 |

(Continued)

FOREIGN PATENT DOCUMENTS

| | | |
|---|---|---|
| JP | 2014-196024 A | 10/2014 |
| KR | 10-2004-0063974 A | 7/2004 |

(Continued)

*Primary Examiner* — Andrew Wendell
(74) *Attorney, Agent, or Firm* — Mintz Levin Cohn Ferris Glovsky and Popeo, P.C.; Peter F. Corless (57) ABSTRACT

An electronic device includes: a display; a sensor module configured to detect movement of the electronic device; and a control module configured to control such that power is supplied to the display when a movement is detected in the electronic device by the sensor module, to determine whether a user of the electronic device is driving a vehicle based on the detected movement of the electronic device, and to control such that the supply of power to the display is limited when it is determined that the user is driving.

11 Claims, 4 Drawing Sheets

(56) References Cited

U.S. PATENT DOCUMENTS

2016/0327407 A1    11/2016  Park

FOREIGN PATENT DOCUMENTS

| KR | 20050026192    | 3/2005  |
| KR | 10-2014-0108994 A | 9/2014 |
| KR | 20140105309    | 9/2014  |
| KR | 20140113118    | 9/2014  |
| KR | 20140113158    | 9/2014  |
| KR | 10-1621876 B1  | 5/2016  |
| KR | 1020160131472  | 11/2016 |

* cited by examiner

ELECTRONIC DEVICE AND DISPLAY CONTROL METHOD THEREOF

CROSS-REFERENCE TO RELATED APPLICATION

This application claims the benefit of and priority to Korean Patent Application No. 10-2015-0063929, filed on May 7, 2015 in the Korean Intellectual Property Office, wherein the disclosure of which is incorporated herein in its entirety by reference.

BACKGROUND OF THE DISCLOSURE

Technical Field

The present disclosure relates generally to electronic devices and, more particularly, to a method of controlling an operation of a display included in an electronic device.

Description of the Related Art

In recent years, with the accelerated development of the electronic technology, various portable electronic devices, such as smart phones, tablet PCs, and wearable devices, have been developed. Such portable electronic devices are convenient for the purpose of use and portability. Such devices have been variously used for playing multi-media data, internet surfing, and the like.

Further, portable electronic devices generally use a battery as a power source. However, when the battery is discharged, if the battery is not charged or the battery is not replaced with another battery, the portable electronic device can no longer be used. Accordingly, it may occur that a portable electronic device cannot be used when it is needed due to the battery being discharged.

SUMMARY OF THE DISCLOSURE

The present disclosure provides an electronic device capable of preventing unnecessary battery consumption by limiting supply of power to a display when a user is driving.

In accordance with embodiments of the present disclosure, an electronic device includes: a display; a sensor module configured to detect movement of the electronic device; and a control module configured to control such that power is supplied to the display when a movement is detected in the electronic device by the sensor module, to determine whether a user of the electronic device is driving a vehicle based on the detected movement of the electronic device, and to control such that the supply of power to the display is limited when it is determined that the user is driving.

The electronic device may further include a communication module configured to receive a steering angle of a steering wheel of the vehicle from an external electronic device. The control module may be further configured to determine whether the user is driving based on the detected movement of the electronic device and the steering angle of the steering wheel.

The control module may be further configured to determine a moving direction of the steering wheel based on the steering angle of the steering wheel and to determine that the user is driving when the moving direction of the steering wheel is identical to a moving direction of the electronic device for a designated number of times or more.

The control module may be further configured to determine an angle formed by the movement of the electronic device and to determine that the user is driving when the angle formed by the movement of the electronic device is identical to the steering angle for a designated number of times or more.

The electronic device may further include a memory configured to store a length from a center of a steering wheel of the vehicle to the electronic device while the user grips the steering wheel. The control module may be further configured to determine a radius formed by the movement of the electronic device and to determine that the user is driving when the radius is identical to the length stored in the memory for a designated number of times or more.

The control module may be further configured to learn the determination result of whether the user is driving and to determine whether the user is driving based on the learned result when the steering angle is not received from the external electronic device.

The electronic device may further include a communication module configured to receive a beacon signal from an external electronic device. The control module may be further configured to determine that the user is driving when the beacon signal is received from the external electronic device.

Furthermore, in accordance with embodiments of the present disclosure, a display control method of an electronic device includes: detecting movement of the electronic device; supplying power to a display of the electronic device when a movement is detected in the electronic device; determining whether a user of the electronic device is driving a vehicle; and limiting the supply of power to the display when it is determined that the user is driving.

The display control method may further include: receiving a steering angle of a steering wheel of the vehicle from an external electronic device; and determining whether the user is driving based on the detected movement of the electronic device and the steering angle of the steering wheel.

The display control method may further include: determining a moving direction of the steering wheel based on the steering angle of the steering wheel; and determining that the user is driving when the moving direction of the steering wheel is identical to a moving direction of the electronic device.

The display control method may further include: determining an angle formed by the movement of the electronic device; and determining that the user is driving when the angle formed by the movement of the electronic device is identical to the steering angle.

The display control method may further include: determining a radius formed by the movement of the electronic device; and determining that the user is driving when the radius is identical to a length from a center of the steering wheel to the electronic device while the user grips the steering wheel for a the designated number of times or more, the length being previously stored in the memory.

The display control method may further include: learning the determination result of whether the user is driving; and determining whether the user is driving based on the learned result when the steering angle is not received from the external electronic device.

The display control method may further include: receiving a beacon signal from an external electronic device; and determining whether the user is driving when the beacon signal is received from the external electronic device.

Furthermore, according to embodiments of the present disclosure, a non-transitory computer readable medium containing program instructions for performing a display control method of an electronic device includes: program instructions that supply power to a display of the electronic device when a movement is detected in the electronic device; program instructions that determine whether a user of the electronic device is driving a vehicle; and program instructions that limit the supply of power to the display when it is determined that the user is driving.

Accordingly, battery consumption of an electronic device may be reduced by limiting the supply of the power to the display when the user is driving.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EMBODIMENTS

Hereinafter, various embodiments of the present disclosure will be described with reference to accompanying drawings. However, the present disclosure is not limited to specific embodiments, but the embodiment includes all modifications, equivalents, and/or substitutes belonging to the technical scope of the embodiment without departing from the spirit of the embodiment. Like or the same elements designated by like or the same numerals are used in drawings.

In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

In the specification, expressions such as "A or B," "at least one of A or/and B," or "one or more of A or/and B" may include all possible combination of listed items. For example, "A or B," "at least one of A and B," or "at least one A or B" may designate all cases of including (1) at least A, (2) at least B, or (3) both of at least one A and at least one B. Expressions such as "first" and "second" represent various constituent elements regardless of orders and/or importance. One constituent element is used to be distinguished from other constituent elements but does not limit corresponding constituent elements. For example, the first user device and the second user device may represent other user device regardless of order or importance. For instance, the first component may be referred to the second component and vice versa without departing from the right of the disclosure.

It will be understood that when an element (e.g., first element) is referred to as being "connected" or "coupled" to another element (e.g., second element), it can be directly connected or coupled to the other element (e.g., third element) or intervening elements may be present. In contrast, when an element (e.g., first element) is referred to as being "directly connected" or "directly coupled" to another element (e.g., second element), there are no intervening elements present.

The expression used in the specification, "~ configured to" may be replaced with "~ suitable for," "~ having the capacity to," "~ designed to," "~ adapted to," "~ made to," or "~ capable of" according to its situation. The term "~ configured to" must not be interpreted to include only "specifically designed to" in hardware. Instead, the expression device "~ device configured to" may mean "~ capable of" together with other device or components. For example, a "processor configured to perform A, B, and C" may means a dedicated processor (e.g., embedded processor) for performing a corresponding operation and a generic-purpose processor (e.g., a CPU or an application processor) capable of performing corresponding operations by executing at least one software program stored in a memory device.

The terminology used herein is for the purpose of describing particular example embodiments only and is not intended to be limiting of the present inventive concept. It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control module. The term "control module" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control module in conjunction with one or more other components, as would be appreciated by a person of ordinary skill in the art.

Furthermore, the control module of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
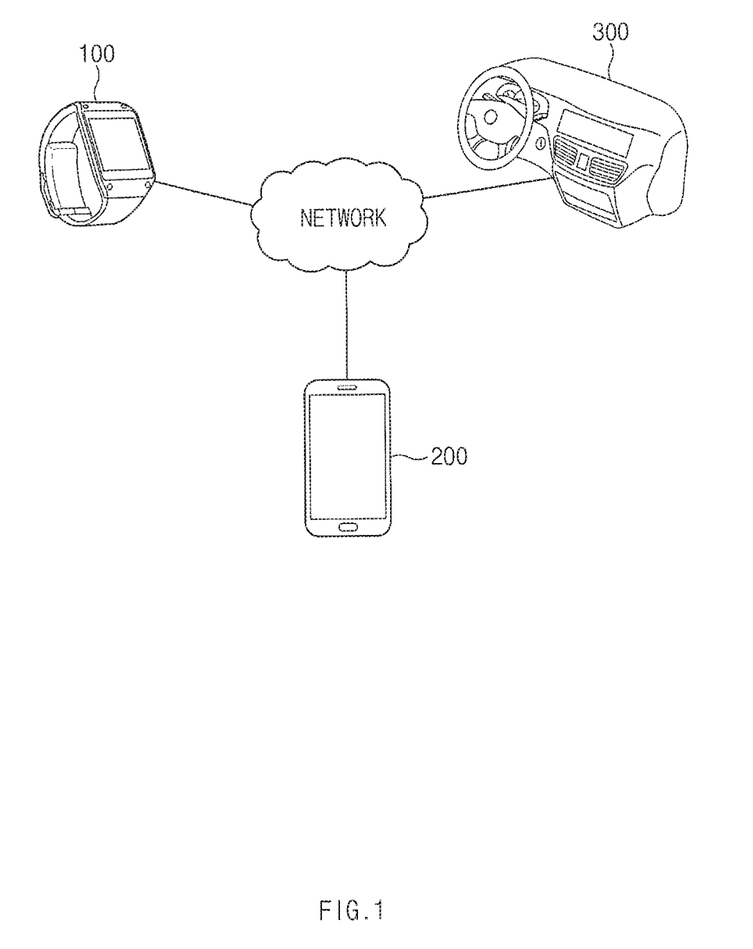
FIG. 1 is a diagram illustrating a vehicle system according to embodiments of the present disclosure.

FIG. 1 is a diagram illustrating a vehicle system according to embodiments of the present disclosure.

As shown in FIG. 1, a vehicle system may include a first electronic device 100, a second electronic device 200, and a third electronic device 300.

The first electronic device 100, the second electronic device 200, and the third electronic device 300 may communicate with each other through a network. For example, the first electronic device 100, the second electronic device 200, and the third electronic device 300 may be connected to each other through a short-range communication technology such as Bluetooth communication, zigbee communication, and near field communication (NFC).

The first electronic device 100 may be a wearable device. For example, the first electronic device 100 may be implemented as a smart watch, a smart band, a smart ring, and a smart glove which may be worn in wrists, fingers, and arms of the user.

If designated movement is detected in the first electronic device 100, the first electronic device 100 may supply power to a display. For example, when the user lifts a wrist in order to operate the first electronic device 100 while wearing the first electronic device 100 on the wrist, the power of the display of the first electronic device 100 may be automatically turned on.

The first electronic device 100 may determine whether a user of the first electronic device 100 is driving. The first electronic device 100 may determine whether a user is driving by using vehicle running information or a beacon signal received from the third electronic device 300. When it is determined that the user is driving, the first electronic device 100 may limit the power supply to the display, even if the designated movement is detected.

The first electronic device 100 may directly communicate with the third electronic device 300 or may communicate with the third electronic device 300 through the second electronic device 200.

The second electronic device 200 may directly communicate with the first electronic device 100 or the third electronic device 300 to transmit information received from the third electronic device 300 to the first electronic device 100. The second electronic device 200 may be a portable electronic device such as a smart phone or a tablet PC.

The third electronic device 300 may collect and transmit vehicle running information to the first electronic device 100. The third electronic device 300 may directly communicate with the first electronic device 100 or may communicate with the first electronic device 100 through the second electronic device 200.

The third electronic device 300 may be an electronic device mounted in a vehicle. For example, the third electronic device 300 may be a vehicle controller for detecting a state of the vehicle and controlling the vehicle, or may be an audio video navigation (AVN) device.

The third electronic device 300 may generate a beacon signal. The third electronic device 300 may generate a beacon signal to be recognized only at a specific location (e.g., driver's seat) inside the vehicle. For example, the third electronic device 300 may control strength of the beacon signal so that the first electronic device 100 may receive the beacon signal at the driver's seat or around a steering wheel.

Figure 2:
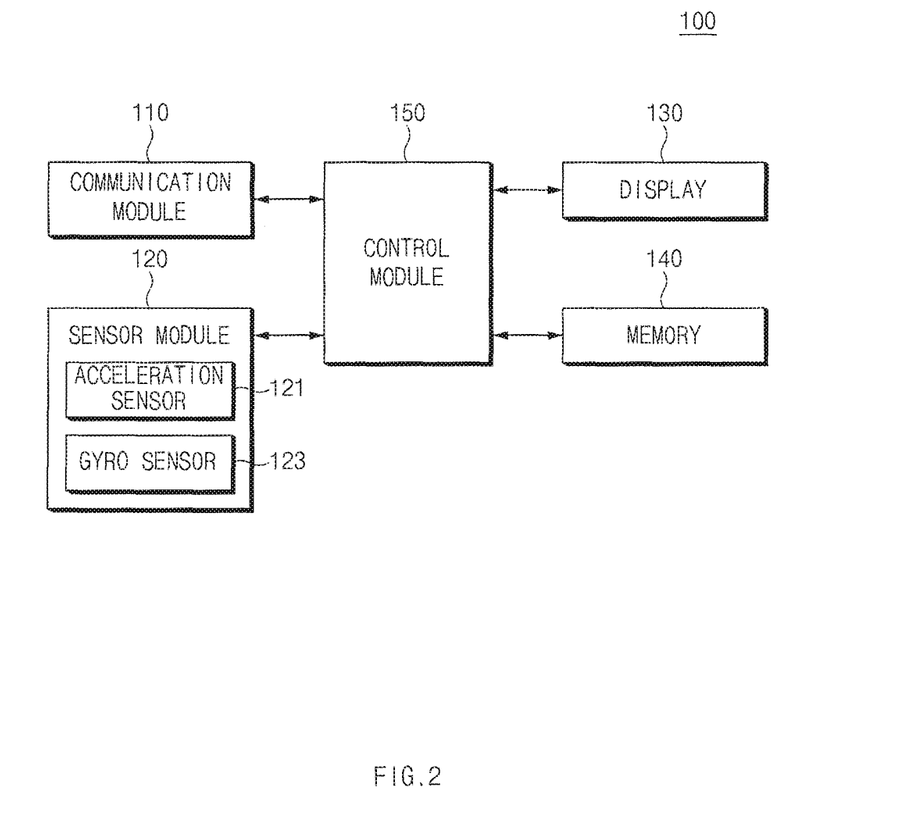
FIG. 2 is a block diagram illustrating a configuration of an electronic device according to embodiments of the present disclosure.

FIG. 2 is a block diagram illustrating a configuration of an electronic device according to embodiments of the present disclosure.

As shown in FIG. 2, the electronic device 100 may include a communication module 110, a sensor module 120, a display 130, a memory 140, and a control module 150.

The communication module 110 may communicate with the second electronic device 200 or the third electronic device 300. According to an embodiment, the communication module 110 may include at least one of a Bluetooth module, a zigbee module, a near field communication (NFC) module, and a global navigation satellite system (GLASS) module.

The communication module 110 may receive vehicle running information from the second electronic device 200 or the third electronic device 300. The vehicle running information may include, for example, a steering angle of the steering wheel and/or a speed of the vehicle. The communication module 110 may receive radius information of the steering wheel from the second electronic device 200 or the third electronic device 300.

The communication module 110 may receive the beacon signal from the third electronic device 300. For example, the communication module 110 may receive the beacon signal from the third electronic device 300 using Bluetooth or the zigbee communication.

The sensor module 120 may detect movement of the first electronic device 100. The sensor module 120 may include an acceleration sensor 121 and a gyro sensor 123. The acceleration sensor 121 may detect acceleration of the electronic device 100. For example, the acceleration sensor 121 may detect acceleration of the electronic device 100 to output an acceleration value of the electronic device 100 in directions of three axes (e.g., x-axis, y-axis, and z-axis). The gyro sensor 123 may detect rotary angular velocity of the first electronic device 100. For example, the gyro sensor 123 may detect an angular velocity of the first electronic device 100 to output angular velocity of the first electronic device 100 in directions of three axes (e.g., x-axis, y-axis, and z-axis).

The display 130 may display user interface and contents. For example, the display 130 may display the user interface and contents provided from the application according to execution of the application.

The display 130 may include various display devices such as a Liquid Crystal Display (LCD), a Plasma Display Panel (PDP), an Organic Light Emitting Diode (OLED), and electronic papers (e.g., e-ink).

The memory 140 may store a length from a center of the steering wheel to the first electronic device 100 in a state in which the user wearing the first electronic device 100 grips the steering wheel of the third electronic device 300. The length from the center of the steering wheel to the first electronic device 100 may include, for example, a radius of the steering wheel and a length formed according to grip of the steering wheel. The radius information of the steering wheel may be received from the third electronic device 300 or may be input from the user to be stored. For example, a radius of the steering wheel may be directly input from the user. As another example, if a type of a running vehicle or a type of a steering wheel is input from the user, a corresponding radius may be calculated. The length formed according to a grip of the steering wheel may be changed according to a wearing position of the first electronic device. The memory 140 may store a preset distance from the steering wheel according to the wearing position of the first electronic device 100 to the first electronic device 100.

The control module 150 may control an overall operation of the first electronic device 100. For example, the control module 150 may drive an operating system or an application program to control various hardware or software constituent elements connected to the control module 150, and may perform various data processing and calculation.

When designated movement is detected in the first electronic device 100, the control module 150 may control to supply power to the display 130. For example, if movement corresponding to a gesture of lifting the wrist by the user is detected in a state in which the power of the display is turned off, the control module 150 may control to supply power to the display.

The control module 150 may determine whether a user of the first electronic device 100 is driving by using the movement of the electronic device 100 and the vehicle running information. When the speed of the vehicle is equal to or greater than designated speed (e.g., 10 km/h), the control module 150 may determine whether the user is driving. The speed of the vehicle may be calculated based on position information received from the third electronic device 300 or a GNSS module.

Figure 3A:
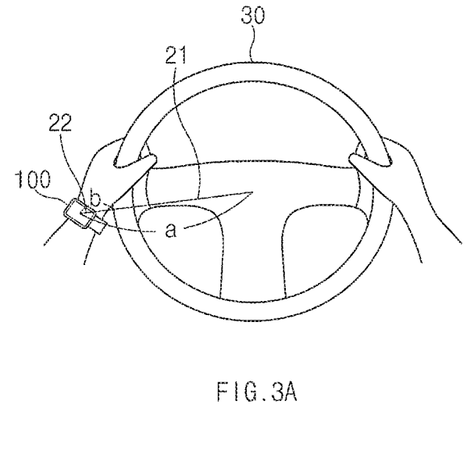
FIGS. 3A and 3B are diagrams illustrating a situation for operating a steering wheel by a user wearing a first electronic device according to embodiments of the present disclosure.
Figure 3B:
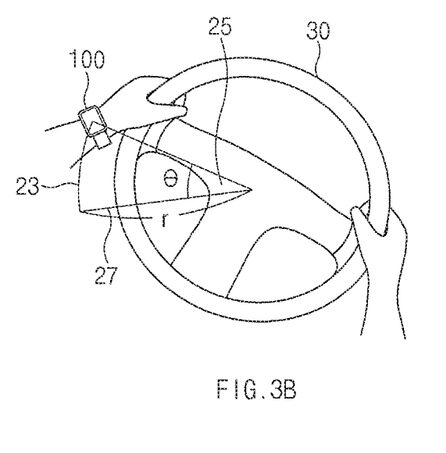

FIGS. 3A and 3B are diagrams illustrating a situation for operating a steering wheel by a user wearing a first electronic device according to embodiments of the present disclosure.

FIG. 3A illustrates a state in which the user wears the first electronic device 100 and grips the steering wheel 30 included in the vehicle. FIG. 3B illustrates a state in which the user rotates the steering wheel 30 in a right direction by an angle θ.

The control module 150 may determine a moving direction of the steering wheel by using the steering angle. For example, the control module 150 may determine whether the steering wheel is rotated in a right direction or in a left direction by using the steering angle. The control module 150 may determine whether the direction of the steering wheel is identical with the moving direction of the first electronic device 100. For example, referring to FIGS. 3A and 3B, when the steering wheel is rotated in a right direction, the control module 150 may determine that the direction of the steering wheel is identical with the moving direction of the first electronic device 100 because the first electronic device 100 is rotated in a right direction 23 which is a rotation direction of the steering wheel.

When the direction of the steering wheel is identical with the moving direction of the first electronic device 100 designated times or more within a designated time, the control module 150 may determine that the user is driving.

The control module 150 may determine an angle formed by the movement of the first electronic device 100. For example, when the first electronic device 100 moves to make a curve corresponding to a circle, the control module 150 may determine an angle formed by the movement of the first electronic device 100 based on the circle formed by the moved track of the first electronic device 100. For example, referring to FIG. 3B, the control module 150 may determine the angle formed by the movement of the first electronic device 100 as θ(25).

The control module 150 may determine whether the angle formed by the movement of the first electronic device 100 is identical with a change amount of the steering angle. As shown in FIGS. 3A and 3B, when the user grips the steering wheel to operate the steering wheel, the angle formed by the movement of the first electronic device 100 may be identical with the change amount of the steering angle. When the direction of the steering wheel is identical with the moving direction of the first electronic device 100 designated times or more within a designated time, the control module 150 may determine that the user is driving.

The control module 150 may determine a radius formed by the movement of the first electronic device 100. For example, when the first electronic device 100 moves to make a curve corresponding to a circle, the control module 150 may determine the radius of the circle formed by the movement track of the first electronic device 100. Referring to FIG. 3B, the control module 150 may determine the radius formed by the movement of the first electronic device 100 as r (27). The control module 150 may determine whether the radius formed by the movement of the first electronic device 100 is identical with a length from a center of the steering wheel stored in the memory 140 to the first electronic device 100. For example, referring to FIGS. 3A and 3B, when the user grips the steering wheel to operate the steering wheel, the radius r(25) formed by the movement of the first electronic device 100 may be identical with a length a(21)+b(22) from the center of the steering wheel stored in the memory 140 to the first electronic device 100. When the radius r(25) formed by the movement of the first electronic device 100 is identical with the length a(21)+b(22) from the center of the steering wheel stored in the memory 140 to the first electronic device 100 designated times or more within a designated time, the control module 150 may determine that the user of the first electronic device 100 is driving.

If at least one of the above determination conditions is satisfied, the control module 150 may determine that the user of the first electronic device 100 is driving.

If the above determination conditions are satisfied designated times or more within a designated time, the control module 150 may determine that the user of the first electronic device 100 is driving.

The control module 150 may determine whether the user of the first electronic device 100 is driving by using a beacon signal received from the third electronic device 300. For example, when the designated beacon signal is received from the third electronic device 300, the control module 150 may determine that the user of the first electronic device 100 is driving.

The control module 150 may learn a determination result on whether the user of the first electronic device 100 is driving. For example, the control module 150 may learn a movement pattern of the first electronic device 100 when the user of the first electronic device 100 is driving and a movement pattern of the first electronic device 100 when the user of the first electronic device 100 is not driving by using a learning algorithm. According to an embodiment, when the steering angle is not received from the third electronic device 300, the control module 150 may determine whether the user is driving by using only the movement of the first electronic device 100 based on the learning result.

If it is determined that the user of the first electronic device 100 is driving, even if the designated movement is detected, the control module 150 may limit the power supply to the display 130. For example, if it is determined that the user of the first electronic device 100 is driving, the control module 150 may turn off a turn-on function of the display according to the movement of the user. For another example, when it is determined that the user is driving in the state in which the turn-on function of the display is set, even if the movement is detected in a state in which the turn-on function of the display according to the designated movement of the user is activated, the control module 150 may not supply the power to the display 130. The case of limiting the power supply to the display 130 may include, for example, the case of reducing a supply amount of power (or, amount of current) to be provided to a display panel or a backlight unit as well as the case of not supplying the power to the display panel or the backlight unit.

Figure 4:
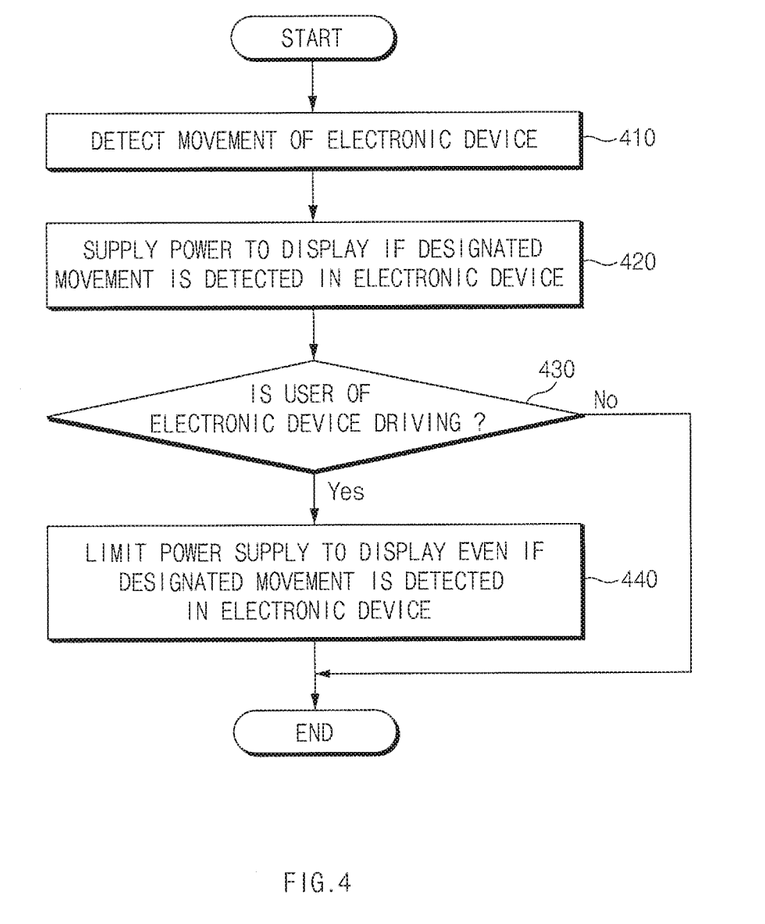
FIG. 4 is a flowchart illustrating a display control method of a first electronic device according to embodiments of the present disclosure.

FIG. 4 is a flowchart illustrating a display control method of a first electronic device according to embodiments of the present disclosure.

As shown in FIG. 4, at operation 410, the first electronic device 100 may detect movement of the first electronic device 100. The first electronic device 100 may detect movement of the first electronic device 100 by using the acceleration sensor and the gyro sensor.

If designated movement is detected in the electronic device, at operation 420, the first electronic device 100 may supply power to a display. For example, when the user lifts a wrist in order to operate the first electronic device 100 in a state in which the user wears the first electronic device 100 on the wrist, the first electronic device 100 may supply the power to the display.

At operation 430, the first electronic device 100 may determine whether the user of the first electronic device 100 is driving. The first electronic device 100 may determine whether the user of the first electronic device 100 is driving by using the movement of the first electronic device 100 and vehicle running information received from the third electronic device 300. The vehicle running information may include, for example, a steering angle of the steering wheel and/or a speed of the vehicle.

The first electronic device 100 may determine a moving direction of the steering wheel by using the steering angle. The first electronic device 100 may determine whether the direction of the steering wheel is identical with the moving direction of the first electronic device 100. When the direction of the steering wheel is identical with the moving direction of the first electronic device 100 designated times or more within a designated time, the first electronic device 100 may determine that the user of the first electronic device 100 is driving.

The first electronic device 100 may determine an angle formed by the movement of the first electronic device 100. The first electronic device 100 may determine whether the angle formed by the movement of the first electronic device 100 is identical with a change amount of the steering angle. When the angle formed by the movement of the first electronic device 100 is identical with a change amount of the steering angle designated times or more within a designated time, the electronic device 100 may determine that the user of the electronic device 100 is driving.

The first electronic device 100 may determine a radius formed by the movement of the first electronic device 100. The first electronic device 100 may determine whether the radius formed by the movement of the first electronic device 100 is identical with a length from a center of the steering wheel stored in the memory 140 to the first electronic device 100. If the radius formed by the movement of the first electronic device 100 is identical with the length from a center of the steering wheel stored in the memory 140 to the first electronic device 100, the electronic device 100 may determine that the user of the electronic device 100 is driving.

If at least one of the above determination conditions is satisfied, the first electronic device 100 may determine that the user of the first electronic device 100 is driving.

If the above determination conditions are satisfied designated times or more within a designated time, the first electronic device 100 may determine that the user of the first electronic device 100 is driving.

When the speed of the vehicle is equal to or greater than designated speed (e.g., 10 km/h), the first electronic device 100 may determine whether the user is driving. The speed of the vehicle may be calculated based on position information received from the third electronic device 300 or a GNSS module.

The first electronic device 100 may receive a beacon signal from the third electronic device 300, and determine whether the user of the first electronic device 100 is driving by using the received beacon signal. For example, if the designated beacon signal is received from the third electronic device 300, the first electronic device 100 may determine that the user of the first electronic device 100 is driving.

The first electronic device 100 may learn a determination result on whether the user of the first electronic device 100 is driving. For example, the first electronic device 100 may learn a movement pattern of the first electronic device 100 when the user of the first electronic device 100 is driving and a movement pattern of the first electronic device 100 when the user of the first electronic device 100 is not driving by using a learning algorithm. When the steering angle is not received from the third electronic device 300, the first electronic device 100 may determine whether the user of the first electronic device 100 is driving by using only the movement of the first electronic device 100 based on the learning result.

When the first electronic device 100 determines that the user is driving, even if the designated movement is detected, at operation 440, the first electronic device 100 may limit the power supply to the display. For example, if it is determined that the user of the first electronic device 100 is driving, the first electronic device 100 may turn off a turn-on function of the display according to the movement of the user.

The term "module" used in this specification may mean, for example, a unit including one or a combination of at least two of hardware, software, or firmware. The "module" may be interchangeably used with terms such as a unit, a logic, a logical block, a component, or a circuit. The "module" may be a minimum unit or a part of integrally configured component. The "module" may be a minimum unit or a part for performing one or more functions. The "module" may be mechanically or electronically implemented. For example, the "module" may include at least one of an application-specific integrated circuit (ASIC) chip, field-programmable gate arrays (FPGAs) or a programmable-logic device for performing certain operations which are known or will be developed.

For example, at least a part of an apparatus (e.g., modules or functions thereof) and a method (e.g., operations) according various embodiments may be implemented by a command stored in computer-readable storage media in the form of a program module. When the command is executed by a processor (e.g., control module 150), the at least one processor may perform a function corresponding to the command. The computer-readable storage media may be, for example, the memory 130.

The computer readable recording medium may include hard disk, floppy disk, magnetic media (e.g., magnetic tape), optical media (e.g., compact disc read only memory (CD-ROM)), digital versatile disc (DVD), magneto-optical media (e.g., floptical disk), a hardware device (e.g., read only memory (ROM), random access memory (RAM), or a flash memory). Further, the program command may include a high-level language code executable by a computer using an interpreter as well as a machine language code created by a compiler. The aforementioned hardware device may be configured to be operated according to at least one software module to perform an operation of the present disclosure, and vice versa.

A module or a program module according to various embodiments may include at least one of the above constituent elements, omit some elements, or may further include additional other constituent elements. The operations performed by the module, the program module or other constituent elements according to various embodiments may be executed in a sequential, parallel, iterative, or heuristic method. Further, some operations may be executed in a different order, omitted, or other operations may be added.

Further, embodiments disclosed in this specification are illustrative for the purpose of description and understanding of technical contents, and does not limit the scope of a technology disclosed in this specification. Accordingly, it should be clearly understood that many variations and modifications of the basic inventive concepts herein taught which may appear to those skilled in the present art will still fall within the spirit and scope of the present disclosure, as defined in the appended claims.

What is claimed is:

1. An electronic device comprising:
a display;
a communication module configured to receive a steering angle of a steering wheel of a vehicle from an external device;
a sensor module configured to detect movement of the electronic device; and
a control module configured to control such that power is supplied to the display when a movement is detected in the electronic device by the sensor module, to determine whether a user of the electronic device is driving the vehicle based on the detected movement of the electronic device and the steering angle of the steering wheel, and to control such that the supply of power to the display is limited when it is determined that the user is driving,
wherein the control module is further configured to calculate a moving direction of the steering wheel based on the steering angle of the steering wheel and to determine that the user is driving when the moving direction of the steering wheel is identical to a moving direction of the electronic device for a designated number of times or more.

2. The electronic device of claim 1, wherein the control module is further configured to determine an angle formed by the movement of the electronic device and to determine that the user is driving when the angle formed by the movement of the electronic device is identical to the steering angle for a designated number of times or more.

3. The electronic device of claim 1, further comprising:
a memory configured to store a length from a center of a steering wheel of the vehicle to the electronic device while the user grips the steering wheel,
wherein the control module is further configured to determine a radius formed by the movement of the electronic device and to determine that the user is driving when the radius is identical to the length stored in the memory for a designated number of times or more.

4. The electronic device of claim 1, wherein the control module is further configured to learn the determination result of whether the user is driving and to determine whether the user is driving based on the learned result when the steering angle is not received from the external electronic device.

5. The electronic device of claim 1, further comprising:
a communication module configured to receive a beacon signal from an external electronic device,
wherein the control module is further configured to determine that the user is driving when the beacon signal is received from the external electronic device.

6. A display control method of an electronic device, the method comprising:
detecting, by a sensor module of the electronic device, movement of the electronic device;
receiving, by a communication module, a steering angle of a steering wheel of a vehicle from an external device;
supplying, by a control module of the electronic device, power to a display of the electronic device when a movement is detected in the electronic device;
calculating, by the control module, a moving direction of the steering wheel based on the steering angle of the steering wheel;
determining, by the control module, whether a user of the electronic device is driving the vehicle based on the detected movement of the electronic device and the steering angle of the steering wheel;
determining, by the control module, that the user is driving when the moving direction of the steering wheel is identical to a moving direction of the electronic device for a designated number of times or more; and
limiting, by the control module, the supply of power to the display when it is determined that the user is driving.

7. The display control method of claim 6, wherein the determining of whether the user device is driving comprises:
determining, by the control module, an angle formed by the movement of the electronic device; and
determining, by the control module, that the user is driving when the angle formed by the movement of the electronic device is identical to the steering angle.

8. The display control method of claim 6, wherein the determining of whether the user is driving comprises:
determining, by the control module, a radius formed by the movement of the electronic device; and
determining, by the control module, that the user is driving when the radius is identical to a length from a center of the steering wheel to the electronic device while the user grips the steering wheel for a the designated number of times or more, the length being previously stored in the memory.

9. The display control method of claim 6, further comprising:
learning, by the control module, the determination result of whether the user is driving; and
determining, by the control module, whether the user is driving based on the learned result when the steering angle is not received from the external electronic device.

10. The display control method of claim 6, further comprising:
receiving, by the control module, a beacon signal from an external electronic device; and
determining, by the control module, whether the user is driving when the beacon signal is received from the external electronic device.

11. A non-transitory computer readable medium containing program instructions for performing a display control method of an electronic device, the non-transitory computer readable medium comprising:
program instructions that supply power to a display of the electronic device when a movement is detected in the electronic device;
program instructions that calculate a moving direction of a steering wheel of a vehicle based on a steering angle of the steering wheel received by a communication module from an external device;

program instructions that determine whether a user of the electronic device is driving the vehicle based on the detected movement of the electronic device and the steering angle of the steering wheel;

program instructions that determine that the user is driving when the moving direction of the steering wheel is identical to a moving direction of the electronic device for a designated number of times or more; and program instructions that limit the supply of power to the display when it is determined that the user is driving.

* * * * *